Figure 1:
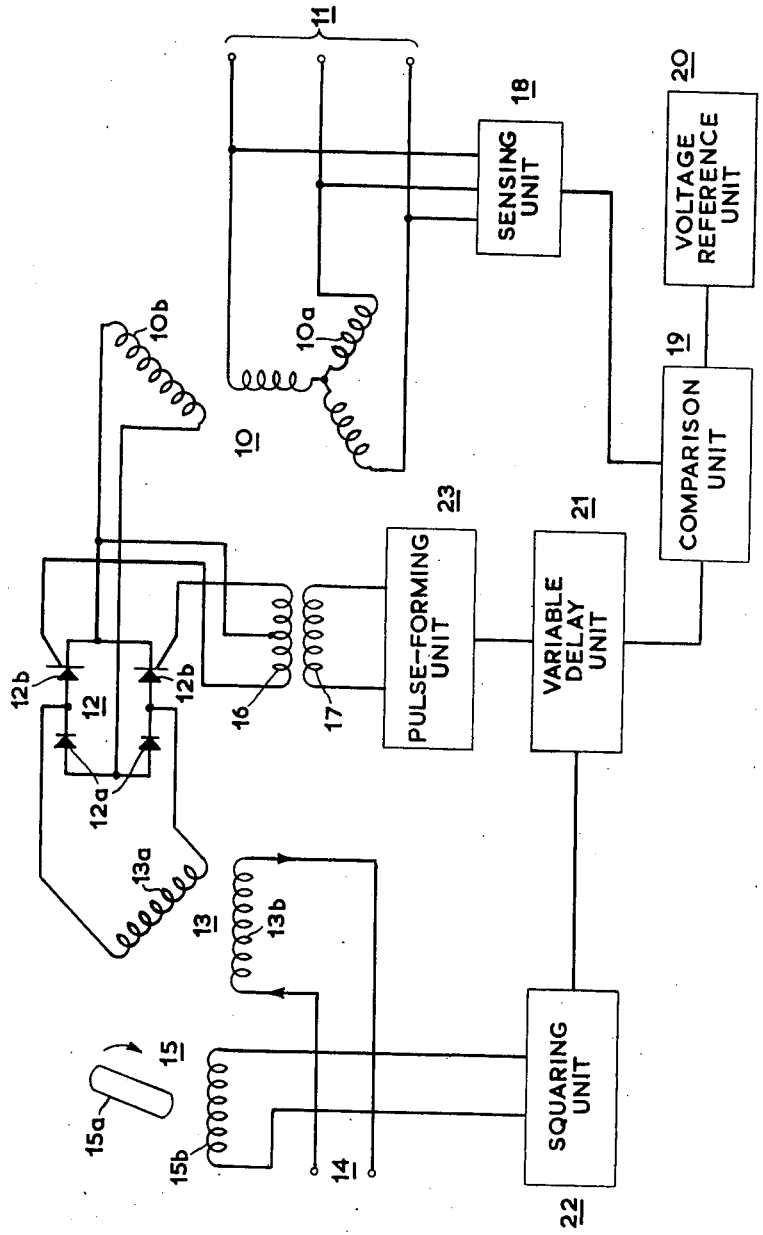

Aug. 10, 1965

K. M. FAULKES 3,200,323

APPARATUS FOR GENERATING ALTERNATING CURRENT

Filed Nov. 6. 1961

2 Sheets-Sheet 1

Inventor:
Kenneth Milford Faulkes
By
Stevens, Davis, Miller & Mosher
Attorneys

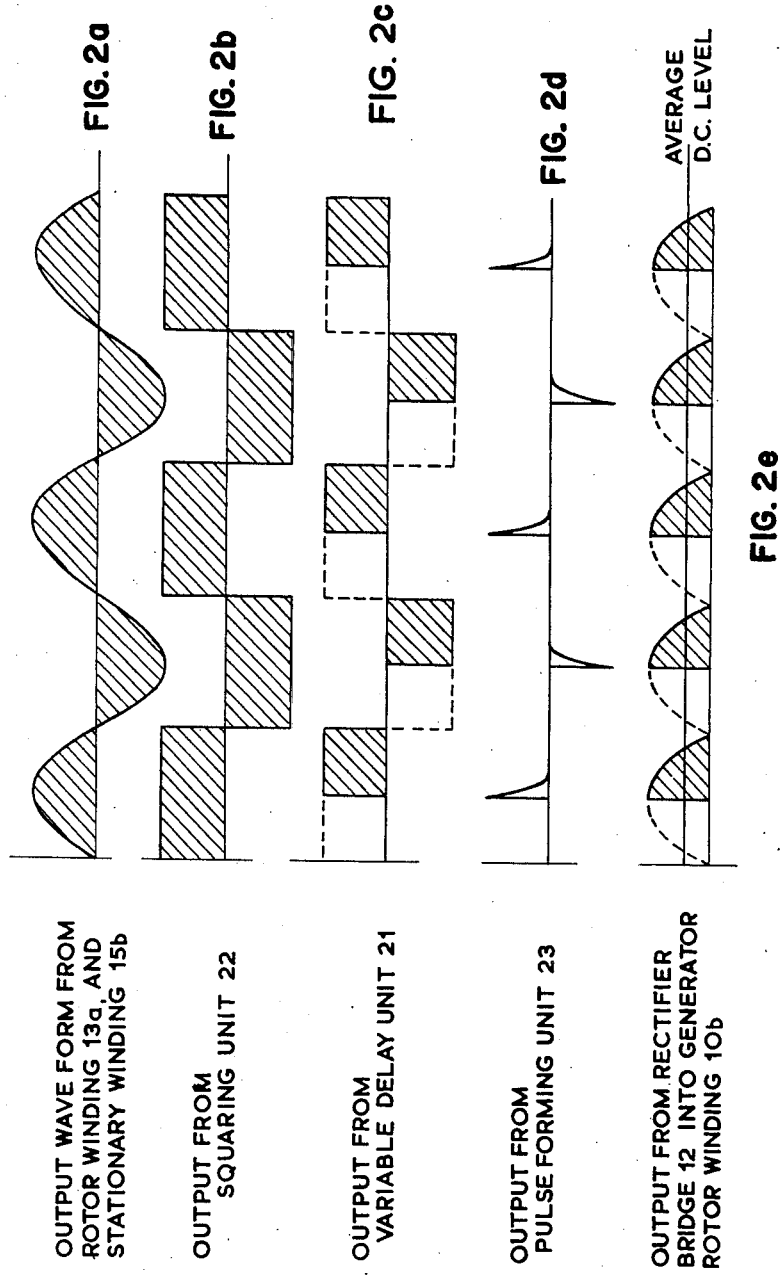

United States Patent Office 3,200,323
Patented Aug. 10, 1965

3,200,323
APPARATUS FOR GENERATING ALTERNATING CURRENT
Kenneth Milford Faulkes, Bradford, England, assignor to The English Electric Company Limited, London, England, a British company
Filed Nov. 6, 1961, Ser. No. 150,394
Claims priority, application Great Britain, Nov. 11, 1960, 38,754/60
3 Claims. (Cl. 322—28)

This invention relates to apparatus for generating alternating current.

According to the invention the apparatus includes, in combination, an A.C. generator having a stationary A.C. output winding and a rotating D.C. exciting winding, an A.C. exciter having stationary exciting means and a rotating A.C. output winding, controlled rectifier means supplied from the rotating output winding and connected to supply the rotating D.C. exciting winding with direct current, the two rotating windings and the controlled rectifier means being mounted on a common shaft, and transfer means for inductively transferring control signals from the stationary part of the machine to the controlled rectifier means whereby to control the firing angle of the controlled rectifier means.

According to a preferred feature of the invention, the transfer means comprises an annular input coil mounted on the stationary part of the machine and adapted to receive the control signals, and an annular output coil mounted on the rotating part of the machine and connected to the controlled rectifier means, the two annular coils being coupled together inductively across an air gap.

According to a further preferred feature of the invention, the apparatus includes control means for automatically varying the firing angle of the controlled rectifier means in accordance with some function of the output of the A.C. generator.

Further preferred features of the invention will appear from the following description with reference to the accompanying drawings where FIG. 1 shows a preferred form of apparatus according to the invention, whilst FIGS. 2(a) to 2(e) show the voltage waveforms at various points in the circuit.

Referring now to FIG. 1, the apparatus comprises a main A.C. generator 10 which has a stator winding 10a connected to supply load terminals 11, and a rotor field winding 10b which is fed through a rectifier bridge circuit 12 for the rotor winding 13a of an A.C. exciter 13. The stator winding 13b of this exciter is fed from a D.C. source 14. Alternatively the exciter may have a permanent magnet field.

The two rotors, and the rectifier bridge circuit, are mounted on a common shaft which also carries the permanent magnet rotor 15a of a small A.C. generator 15. The rotor of this generator has the same number of poles as the exciter stator winding 13b, whilst its stator winding 15b has the same number of poles as the exciter rotor winding 13a. The two rotors are aligned with respect to each other so that the voltage induced in the stator winding 15b of the A.C. generator 15 is approximately equal in phase and frequency with the voltage induced in the rotor winding 13a of the exciter 13.

The rectifier bridge circuit 12 comprises two uncontrolled silicon rectifiers 12a and two controlled silicon rectifiers 12b. The control electrodes of the controlled rectifiers are connected to the outer ends of a centre-tapped annular winding 16 which is carried by the common shaft and which is inductively coupled with a stationary annular winding 17. The centre tap of the winding 16 is connected to the cathodes of the rectifiers.

Connected across the load terminals 11 is a sensing unit 18 which applies a voltage dependent on generator load voltage to a comparison unit 19 where this voltage is compared with the voltage output of a substantially constant voltage reference unit 20. The error voltage derived from the comparison unit is then fed to a variable delay unit 21.

The output from the winding 15b of the small A.C. generator 15 (see FIG. 2a) is applied to a squaring unit 22 and the output from this unit (see FIG. 2b) is passed through the variable delay unit 21 to a pulse forming unit 23. The pulses from this unit (see FIG. 2d) are applied to the stationary annular winding 17.

In operation, the error voltage derived from the comparison unit 19 is applied to the variable delay unit 21 so as to vary the instant in time, with respect to the sine wave output of the winding 15b, when the square fronted pulse (see FIG. 2c) is applied to the pulse forming unit 23. This in turn determines the instant at which the pulses (see FIG. 2d) are applied to the stationary winding 17, and thus the firing angle of the controlled rectifiers 12b.

The average D.C. output voltage applied to the exciting winding 10b of the main generator 10 is, of course, dependent on the firing angle of the controlled rectifiers. If the output voltage of the main generator is low compared with the reference voltage the firing angle of the controlled rectifiers will be advanced, and if the voltage is high the firing angle will be retarded.

The field current of the exciter 13 may be maintained constant, or adjusted to suit the load as required.

Whilst the exciter winding 13a is shown in the drawing as a single phase winding, it will be obvious that any number of phases may be used. Other types of controlled rectifier, provided they can withstand the centrifugal forces set up when the machine is in operation, may be used. The units 18 to 23 may be of any known type. Unit 21 may, for example, be a magnetic amplifier.

As an alternative to the use of the small A.C. generator 15, the squaring unit 22 may be fed from a stationary winding which is inductively coupled with the rotor winding 13a of the exciter 13, providing that the rotor winding 13a is unbalanced so that a net D.C. flux is produced.

What I claim as my invention and desire to secure by Letters Patent is:

1. Apparatus for generating A.C. including, in combination, an A.C. generator having a stationary A.C. output winding and a rotating D.C. exciting winding, an A.C. exciter having stationary exciting means and a rotating A.C. output winding, controlled rectifier means supplied from the rotating output winding and connected to supply the rotating D.C. exciting winding with direct current, the two rotating windings and the controlled rectifier means being mounted on a common shaft, and transfer means for inductively transferring control signals from the stationary part of the machine to the controlled rectifier means whereby to control the firing angle of the controlled rectifier means.

2. Apparatus according to claim 1, wherein the transfer means comprises an annular input coil mounted on the stationary part of the machine and adapted to receive the control signals, and an annular output coil mounted on the rotating part of the machine and connected to the controlled rectifier means, the two annular coils being coupled together inductively across an air gap.

3. Apparatus for generating A.C. including, in combination, an A.C. generator having a stationary A.C. output winding and a rotating D.C. exciting winding, an A.C. exciter having stationary exciting means and a rotating A.C. output winding, controlled rectifier means supplied from the rotating output winding and connected to supply the rotating D.C. exciting winding with direct current, the two rotating windings and the controlled rectifier means being mounted on a common shaft, transfer means for inductively transferring control signals from the stationary part of the machine to the controlled rectifier means whereby to control the firing angle of the controlled rectifier means, and control means arranged automatically to vary the firing angle of the controlled rectifier means in accordance with some function of the output of the A.C. generator.

References Cited by the Examiner

UNITED STATES PATENTS 2,659,044 11/53 MacNeil.
3,030,531 4/62 Lessmann.

LLOYD McCOLLUM, *Primary Examiner.*